United States Patent Office 2,873,249
Patented Feb. 10, 1959

2,873,249
METHOD FOR INHIBITING THE FORMATION AND GROWTH OF SLIME IN WATER SYSTEMS

Herbert Schwartz, Vineland, N. J.

No Drawing. Application September 23, 1957
Serial No. 685,400

6 Claims. (Cl. 210—64)

This invention relates to a method for inhibiting the formation and growth of slime in water systems. More particularly, the present invention is concerned with a method for inhibiting the formation and growth of slime in paper mill water systems handling aqueous dispersions of paper-making fibers involving the introduction to such systems of bis-1,4-bromacetoxy-2-butene.

Slime, such as that encountered in paper mill water systems, is an accumulation of billions of bacteria, and has a physical consistency similar to that of gelatine. Slime may be considered to exist generally in three phases, namely: slime forming organisms reproducing or multiplying in free suspension in the water system; agglomerating, proliferating masses of such organisms, i. e. glomerules of slime varying in size from small barely visible tapioca-like balls up to masses the size of peas or marbles, commonly called "fish eyes," also in free suspension in the water system; and, jelly-like masses, which may be in the form of stringy or ropy streamers several inches long, attached to the containing walls of the paper mill water system at different points throughout the system.

Slime often acquires a color, such as that of the paper-making stock, or that of the organisms composing the slime. The color, which may be green, yellow, tan, black, etc., may also be produced by the action of the bacteria on chemicals in the water.

The presence of slime presents a multitude of problems to the paper manufacturer. If massive clumps of slime break loose from the walls of the system and are carried into the paper, objectionable "slime spots," which are horny and glassy in appearance are formed. Breaks in the paper at the wet end of the paper-making equipment are also caused by slime masses. Other difficulties are clogged felts, wire and screens and decreased pulp freeness.

The modern paper mill, operating at ever greater speed and to more exact specifications cannot tolerate the slowing down and malfunctioning of equipment resulting from slime inclusion in the paper-making stock. Thus, for the past decade or more, slime inhibition or control has become an accepted and required aspect of paper-making technology.

Bacteria alone do little or no harm as slime causitive agents, but do so only on proliferation and agglutination. Slime control, i. e. inhibiting the formation and growth of slime, therefore, may be said to be effected by impairment of a vital function of slime forming organisms, namely reproduction.

There is no absolute correlation between bacteria count and the presence of slime in a paper mill water system. Thus, a paper mill may have many organisms introduced into the circulating water system, as for example with the incoming water supply or from the paper stock, such as that derived from waste paper products, and no slime will form because the system lacks the proper conditions, such as adequate food, water temperature, degree of aeration, pH, and the like, which permit slime forming bacteria to multiply. However, experience has shown that reduction in bacteria count is closely related to the prevention and growth of slime. The reason for this is that it is only reasonable to expect that a reduction in bacteria count will likewise result in inhibiting the formation of slime composed of the same organisms.

Bacteria count is, therefore, useful in establishing the effectiveness of a toxicant where slime is known to be present in a water system. By taking bacteria counts at intervals after addition of a particular toxicant to the water system, accompanied by visual observations for actual slime formation, the efficacy of the treatment may thus be determined.

A good germicide is not necessarily a good slime controllant, and high killing power does not necessarily indicate corresponding slime inhibiting power. Thus, results obtained with a particular bactericide and/or fungicide by laboratory methods do not necessarily indicate the degree of slime inhibition, if any, which may be obtained by the use of the same material under actual paper mill conditions. There are a number of reasons for this lack of correlation in results. For example, it is difficult to simulate in laboratory experiments such factors as time of exposure to the toxicant, degree of aeration, amount of suspended deactivating substances, ratio of toxicant to microorganisms, nutrient concentration, ecological balance, rate of introduction of new bacteria, rate of depletion of toxicant from the system, and the like. Thus, the toxicant cannot be considered independent of the test method. Because of the empirical nature of slime control, noting how organisms fair in the mill system when exposed to a particular slime control agent under economically practical conditions is paramount in determining the efficacy of the agent.

In order to overcome the problems created by the presence of slime in paper-making operations, paper manufacturers have for a long time been seeking a slime control agent which is not merely a periodic preventive to keep slime in abeyance, as for example by causing regression of already formed slime accretions, but rather one which would give improved and sustained control of slime formation at reasonable cost.

A number of compounds have been employed commercially as slime controllants, and probably the one most extensively used is chlorine.

Chlorine alone, or together with ammonia to form chloramine in some instances has proved to be a satisfactory slime controllant of moderate cost. Frequently, however, chlorine is not sufficient in itself to adequately control slime and other chemicals must be employed in conjunction therewith. Furthermore, chlorine does not persist in the system for any extended period of time, and there is some indication that bacteria in paper mills not only survive chlorine treatment but even reproduce in the presence of free chlorine. Another disadvantage of chlorine is that at concentrations sufficient to control slime in the mill considerable corrosion of metal parts due to electrolysis effects between dissimilar metals may take place.

Next to chlorine, probably the most widely used slime control agents are phenylmercury salts, such as phenylmercuric acetate. In mills using phenylmercury salts, the possibility of mercury, a strong poison, being present in the paper in excessive amounts has been, if not a real, at least a severe psychological hazard for the paper manufacturer. Another disadvantage in the use of mercury compounds is that brass may undergo some crystallization or embrittlement when exposed thereto at concentrations on the order of 1:20,000. Such crystallization and embrittlement can be severe on brass screens, resulting in some shortening of the screen life. Phenylmercuric acetate, although an extremely effective germicide, is deactivated by the presence of organic matter. For example, phenylmercuric ions will react readily with the sulfhydryl group present in protein and become at least partially deactivated. Furthermore, phenylmercuric compounds apparently have an affinity for cellulose and are thus rapidly removed from the paper mill system along with the paper-making fibers. For this reason, phenylmercury does not provide protracted or sustained slime control, but rather acts as a periodic preventative by effecting slime retrogression or partial or total slime destruction.

Chlorinated phenols have also been rather widely used as slime control agents. Unfortunately, they have an offensive odor and taste which is imparted to the water and to the paper. Such paper will impart its offensive odor to fatty food stuffs, and thus is unsuitable for packaging of such food stuffs.

Quaternary ammonium compounds are excellent germicides and it was hoped that good control of slime in paper mills might be effected with these chemicals which have assumed such an important role in milk sanitation and the like. Unfortunately, quaternary ammonium compounds are so substantive to paper fiber that they are rapidly depleted from the system. Furthermore, rather than reacting with bacteria only, they also react with pulp and are thus rapidly inactivated. Quaternary ammonium compounds also cause foaming and change in physical properties of the paper stock. These undesirable properties of quaternary ammonium salts have largely precluded their use as slime controllants.

Many other chemicals, such as sulfur and heavy metal compounds, have been suggested for use in the control of slime. Sulfur compounds, such as reaction products of formaldehyde, methylamine and carbon disulfide, and thiothiadizine compounds are decomposed rapidly under paper mill conditions into compounds such as hydrogen sulfide and other odorous substances which have no bactericidal action. Heavy metal compounds, such as arsenicals, suffer from the same disadvantages as the mercurials, e. g. high toxicity, and therefore are not the most desirable slime control agents.

A primary object of the present invention is to provide a novel method for inhibiting the formation and growth of slime in water systems.

Another object of this invention is to provide a relatively inexpensive method for inhibiting the formation and growth of slime in paper mill water systems handling aqueous dispersions of paper-making fibers involving the use of bis-1,4-bromacetoxy-2-butene.

A further object of this invention is the provision of a method for controlling slime formation in paper mill water systems by introduction to such systems of a compound which exhibits outstanding bactericidal and fungicidal properties in a paper mill water system environment.

A still further object of this invention is the provision of an economically feasible method for providing sustained control of slime formation in paper mill water systems by the introducion of a certain slime control agent which is effective in high dilution, odorless, and is neither irritating to skin under conditions of normal exposure nor corrosive to metals.

Yet another object of the instant invention is to provide an improved method for overcoming the problem of slime in paper mills which obviates the previously discussed disadvantages of methods heretofore employed.

These and other objects of this invention will become further apparent from a consideration of this specification and appended claims.

According to this invention there is provided a novel method for inhibiting the formation and growth of slime in water systems which comprises introducing to a water system bis-1,4-bromacetoxy-2-butene.

It was found that bis-1,4-bromacetoxy-2-butene is an extremely effective material for inhibiting the formation and growth of slime such as that encountered in paper mill water systems handling aqueous suspensions of cellulosic paper-making fibers. Laboratory tests had shown that this bromacetoxy compound was not as effective as phenylmercuric acetate, which was chosen as a reference standard because it is one of the more effective and widely used slime controllants. However, under actual paper mill conditions treatment of mill water systems with bis-1,4-bromacetoxy-2-butene according to the method of this invention was found to control slime more effectively and for substantially greater periods of time than phenylmercuric acetate.

Bis-1,4-bromacetoxy-2-butene, unexpectedly, was found to possess certain physical and chemical properties which one would postulate as being desirable in an ideal slime preventative.

Bis-1,4-bromacetoxy-2-butene employed in the method of this invention has both excellent bactericidal and fungicidal properties. This fact alone was not indicative of its suitability as a slime controllant. As stated previously, slime control is empirical, and noting how slime-forming organisms fare in their natural environment, e. g., the paper mill water system, is paramount in determining the efficacy of a particular slime control treatment. However, it was found that under paper mill conditions bis-1,4-bromacetoxy-2-butene employed in this invention does not act merely as a periodic preventative, such as phenylmercuric acetate, to keep slime in abeyance, as for example by causing regression of already formed slime accretions, but actually provides sustained inhibition of slime formation and growth for extended periods of time, and this advantageous result may be obtained at reasonable cost. This fact will become more clearly apparent from a consideration of the specific examples of the method of this invention hereinbelow.

Bis-1,4-bromacetoxy-2-butene employed in the instant method also possesses other advantageous properties. For example, it is odorless and non-irritating to skin under conditions of normal use.

There is naturally serious concern as to the toxicity of any chemical used in a paper mill water system, not only because the chemical may present a health hazard to mill personnel, but because the chemical may become a part of the finished paper product and may thereby come in direct contact with the consumer or food he eats through contact with a paper package. Of the two, safety of mill personnel is the more easily controlled; however, it is by far preferable to use a chemical that is neither obnoxious nor dangerous to handle.

Any substance which destroys a microorganism must of necessity be toxic at least to that organism. There is a class of compounds, however, although toxic to bacteria and fungi, is not highly toxic to humans. Tests have shown that the material employed in the instant method is of this class. For example 12 human subjects had patches of cloth containing 1000 p. p. m. of bis-1,4-bromacetoxy-2-butene held to their skin by adhesive plaster for three days without experiencing any ill effects. Tests conducted by an allergist with paper made in water containing a greater amount of bis-1,4-bromacetoxy-2-butene than that needed to effectively control slime produced no reaction with 59 patients who had a history of allergies.

In addition to the above, experiments conducted in paper mills showed that bis-1,4-bromacetoxy-2-butene is not substantive to cellulose paper-making fibers and is thus not carried out of the mill water system onto the paper product. Thus, the paper manufacturer in employing the instant process for slime control is no longer faced with either a real or psychological hazard as regards providing the public with a paper product which may be toxic to humans.

Another advantage of the process of this invention is that the materials employed therewith are noncorrosive to metals. Strips of iron, brass and copper immersed in a 30 percent solution of the material used in the instant invention for a period of 60 days showed no corrosion.

In carrying out the method of this invention, bis-1,4-bromacetoxy-2-butene may be added to a paper mill water system to inhibit the formation and growth of slime in various ways depending upon the requirements of the system. As stated above, slime formation and growth depend not only on the presence of slime-forming bacteria but also on the presence of conditions within the water system which promote bacteria reproduction. Such factors as the presence of food stuff for the bacteria, water temperature, degree of aeration, pH, and the like, which affect bacteria reproduction, vary from time to time and from point to point in a particular water system. Likewise, different mill systems will have different slime problems. For these reasons, the manner in which the method of this invention is carried out will be subject to numerous variations as regards quantity of slime control agent added, point of addition and the like.

Bis-1,4-bromacetoxy-2-butene used in the instant method dissolves completely in paper mill systems under conditions by which the method is practiced and may be added at any point in the system. Preferably, it is added at the site or sites of greatest slime accumulation, which is generally at or about the paper-making machine. It may be added at the fan pump or the distributing trough or at any point just before the machine where good mixing will occur. The remainder of the system, generally fed with considerable portions of recirculating white water, should have a sufficient level of the slime controllant to inhibit slime formation and growth.

Because bis-1,4-bromacetoxy-2-butene is extremely effective in high dilution, preferably only a small but effective amount thereof which is necessary to inhibit slime formation or further growth of already formed slime need be used. Since paper-making machines are shut down periodically, e. g. every week or two to replace a screen, felt, etc., during which shut down period the machine is generally scrubbed, the method of this invention may be carried out so as to permit some minor but controlled slime formation which does not interfere with either machine operation or paper product. Slime affixed to walls of the system may also be made to retrogress by the use of greater quantities of the slime controllant than are needed to control slime. The amount of slime controllant required generally must be determined empirically due to the multitude of factors which affect bacteria reproduction.

In order to determine whether sufficient slime control agent has been employed, visual observations for the presence of slime accompanied by periodic microbiological counts of samples of the system water may be employed. Methods for making bacteria counts of water samples are well known and thus there is no need to present any detailed discussion of these methods herein.

In most instances the addition of from about 0.1 to about 3 ounces of slime control agent to the water system for each ton of paper produced will effectively control slime in most paper mill water systems. Where mill conditions are such that the slime problem is severe, higher concentrations in the above range should generally be employed to effectively control slime. Lesser slime problems, of course, may be effectively overcome with somewhat lower concentrations.

Because the slime control agent used in the instant method is effective for periods as long as 24 hours, it may be added periodically as a slug when bacteria count indicates the need for further treatment. Preferably, however, it is added in a continuous but controlled fashion as for example by means of a proportionating pump.

Bis-1,4-bromacetoxy-2-butene, may be added at 100 percent strength or in the form of solutions, generally containing from about 5 to about 50 percent, and preferably from about 10 to about 30 percent, by weight, of active ingredient dissolved in a suitable inert solvent such as ethylene dichloride, methylene dichloride, xylene, and the like.

Bis-1,4-bromacetoxy-2-butene employed in the method of this invention may be made in the following manner.

1 mole of cis-2-butene-1,4-diol and 2.5 moles of bromacetic acid are dissolved in 500 cc. of benzene. Esterification occurs spontaneously. The water formed in the course of the reaction is separated whereby the equilibrium of the reaction is shifted towards the ester formation and virtually all the diol is esterified. After the completion of the reaction the benzene is distilled off and the residue is washed first with dilute sodium bicarbonate solution and then with water until the washing water is neutral. In this manner, crude bis-1,4-bromacetoxy-2-butene is obtained. It is dried over calcium chloride and purified by distillation in a high vacuum. The purified ester is a colorless liquid of B. P. 135–136° C. under 0.005 mm. Hg. Its index of refraction is $n_{20}^D = 1.5223$.

The method of this invention was carried out in a paper board mill which had used a combination of phenylmercuric acetate and chlorine for slime control for 10 years. In order to evaluate results obtained by the instant method, the mill was run for a one week period using phenylmercuric acetate alone, which was added at the wet end of the paper-making machine on the basis of 0.5 ounce per ton of paper produced. During this period, 27 breaks in the paper web were caused by the inclusion of slime masses in the paper which reduced its tensile strength.

For a similar period of time the mill was run with slime control being effected by the method of this invention employing bis-1,4-bromacetoxy-2-butene on the basis of 0.5 ounce per ton of paper produced. No slime breaks occurred and a scrub up of the machine at the end of the run revealed very little accumulation of slime. While this small accumulation of slime could have been eliminated by using slightly greater amounts of the slime controllant, slime was effectively controlled at minimum cost.

Tests were also conducted in another paper mill, a corrugated paper mill which ordinarily employed various combinations of phenylmercuric acetate, trichlorophenol and chlorine to control slime. In these tests a slug feed of slime controllant was made once every 24 hours.

To afford a comparison, the mill was run using a mixture of 1 part of phenylmercuric acetate and 5 parts of potassium trichlorophenate, the amount of the slug feed being comparable to 2.5 ounces of slime control composition per ton of paper produced. At the time of addition of this mixture, the bacteria count of the water system was 100,000 colonies per ml. One half hour after addition of the mixture, the bacteria count fell to 60,000 colonies and the decrease in the number of colonies continued until it reached 15,000 colonies after 8 hours. At the end of the 24 hour period, the count had again risen to 100,000 colonies.

The test was repeated employing the instant method with a slug feed of bis-1,4-bromacetoxy-2-butene at the beginning of the 24 hour period. This slug feed is equivalent to 0.5 ounce per ton of paper produced. This addition of bis-1,4-bromacetoxy-2-butene is at a cost rate slightly lower than that for the phenylmercuric acetate-trichlorophenate mixture. No appreciable drop in baceria colony count took place during the first 3 hours after treatment. From then on slime control was exceedingly evident and after 7 hours the colony count had reached zero. At the end of 24 hours the count had risen to only 18,000 colonies per ml. The results of these tests are set forth in Table I.

Table I

| Time (in hours) after Treatment | Slime Controllant A [1] | | Slime Controllant B [2] | |
|---|---|---|---|---|
| | Bacteria Count Colonies/ml. | Control, Percent | Bacteria Count, Colonies/ml. | Percent Control |
| 0 | 100,000 | 0 | 100,000 | 0 |
| ¼ | 100,000 | 0 | 100,000 | 0 |
| ½ | 70,000 | 30 | 90,000 | 10 |
| 1 | 85,000 | 15 | 85,000 | 15 |
| 2 | 60,000 | 40 | 75,000 | 25 |
| 3 | 60,000 | 40 | 25,000 | 75 |
| 4 | 30,000 | 70 | 15,000 | 85 |
| 5 | 25,000 | 75 | 10,000 | 90 |
| 6 | 25,000 | 75 | 2,000 | 98 |
| 7 | 25,000 | 75 | 0 | 100 |
| 8 | 15,000 | 85 | 0 | 100 |
| 24 | 100,000 | 0 | 18,000 | 82 |

[1] mixture of phenylmercuric acetate and trichlorophenate 1:5 ratio.
[2] Bis-1,4-bromacetoxy-2-butene.

These results show that the method of this invention is not only remarkably effective, but that slime control is sustained for substantial periods of time.

Additional tests were run in a paper mill manufacturing newsprint in which tests the present method was compared with treatment using phenylmercuric acetate.

A slug of phenylmercuric acetate equivalent to 0.5 ounce per ton of paper produced was added at the wet end of the paper machine. Counts of bacteria colonies were made during an 8 hour period succeeding addition of the slime controllant and the results are set forth in Table II. A similar test employing the method of this invention was made using an equivalent amount of bis-1,4-bromacetoxy-2-butene. The results of this test are also set forth in Table II.

Table II

| Time (in hours) after Treatment | Phenylmercuric Acetate | | Bis-1,4-bromacetoxy-2-butene | |
|---|---|---|---|---|
| | Bacteria Count, Colonies/ml. | Percent Control | Bacteria Count, Colonies/ml. | Percent Control |
| 0 | 590,000 | 0 | 570,000 | 0 |
| ¼ | 30,000 | 95 | | |
| ½ | 130,000 | 78 | 480,000 | 16 |
| 1 | 250,000 | 58 | 360,000 | 37 |
| 2 | 430,000 | 27 | 100,000 | 83 |
| 3 | 420,000 | 29 | 80,000 | 86 |
| 4 | 410,000 | 30 | 32,000 | 94 |
| 5 | 400,000 | 32 | 24,000 | 96 |
| 6 | 440,000 | 25 | 4,000 | 99.3 |
| 7 | 350,000 | 41 | 3,000 | 99.5 |

These tests show that the method of this invention provides sustained slime control for a substantially longer period of time than does treatment involving the use of phenylmercuric acetate.

Although it has been found that the method of this invention employing as the sole slime controllant bis-1,4-bromacetoxy-2-butene is extremely effective in providing sustained slime control, other bactericides and fungicides may be employed along with this bromacetoxy compound provided they do not interfere to any significant degree with the effectiveness of the treatment.

Although the method of this invention has been described particularly with respect to slime control in paper mill water systems, it also has application in other industrial water systems.

Since certain changes in carrying out the above method may be made without departing from its scope, it is intended that all matter contained in the above description shall be interpreted as illustrative and not in a limiting sense.

This application is a continuation-in-part of my copending application Serial No. 574,611, filed March 29, 1956, now Patent No. 2,840,598.

It is claimed:

1. A method of inhibiting the formation and growth of slime in a paper mill water system comprising an aqueous dispersion of paper-making fibres which comprises introducing to the system bis-1,4-bromacetoxy-2-butene.

2. A method for inhibiting the formation and growth of slime in a paper mill water system comprising an aqueous dispersion of paper-making fibers which comprises introducing to the system from about 0.1 to about 3 ounces of bis-1,4-bromacetoxy-2-butene for each ton of paper produced.

3. The method of claim 2 in which a solution of from about 5 to about 50 percent, by weight, of bis-1,4-bromacetoxy-2-butene in an inert organic solvent is introduced to the system.

4. The method of claim 3 in which a solution of from about 10 to about 30 percent, by weight of bis-1,4-bromacetoxy-2-butene in ethylene dichloride is added to the system.

5. A method of treating a paper mill water system comprising an aqueous dispersion of paper-making fibers which comprises introducing to the system bis-1,4-bromacetoxy-2-butene in a small amount effective to inhibit the formation and growth of slime.

6. A method for treating a paper mill water system comprising an aqueous dispersion of paper-making fibers which comprises introducing to the system cis-1,4-bis-bromacetoxy-2-butene in a small amount effective to inhibit the formation and growth of slime.

No references cited.